US011328362B2

(12) United States Patent
Villalonga et al.

(10) Patent No.: US 11,328,362 B2
(45) Date of Patent: May 10, 2022

(54) DYNAMIC MODELING AND BENCHMARKING FOR BENEFITS PLANS

(71) Applicant: ADP, Inc., Roseland, NJ (US)

(72) Inventors: Maria Milian Villalonga, Miami, FL (US); Shahrouz Ebadian, Miami, FL (US); Cristian Orihuela, Miami Beach, FL (US); Allen G Lee, Miami, FL (US)

(73) Assignee: ADP, Inc., Roseland, NJ (US)

( * ) Notice: Subject to any disclaimer, the term of this patent is extended or adjusted under 35 U.S.C. 154(b) by 538 days.

(21) Appl. No.: 15/165,262

(22) Filed: May 26, 2016

(65) Prior Publication Data

US 2017/0345099 A1    Nov. 30, 2017

(51) Int. Cl.
*G06Q 40/08* (2012.01)
*G06F 3/0482* (2013.01)
(Continued)

(52) U.S. Cl.
CPC ........... *G06Q 40/08* (2013.01); *G06F 3/0482* (2013.01); *G06F 3/0484* (2013.01);
(Continued)

(58) Field of Classification Search
CPC  G06Q 40/08; G06Q 10/06313; G06T 11/206; G06T 2200/24; G06F 3/0484; G06F 3/0482
See application file for complete search history.

(56) References Cited

U.S. PATENT DOCUMENTS 8,407,064 B1    3/2013 Klieman et al.
8,515,781 B2 *  8/2013 Kaehler ................. G06Q 40/12
                                                        705/3
(Continued)

FOREIGN PATENT DOCUMENTS

WO    WO-2015187558 A1 * 12/2015 ............. G06Q 40/08

OTHER PUBLICATIONS

Allison K. Hoffman, University of Pennsylvania Carey Law School, Howell E. Jackson, Harvard University "Retiree Out-of-Pocket Healthcare Spending: A Study of Consumer Expectations and Policy Implications", University of Pennsylvania Carey Law School, Penn Law: Legal Scholarship Repository, pp. 7-26 (Year: 2013).*

(Continued)

*Primary Examiner* — Ryan D Donlon
*Assistant Examiner* — Tony P Kanaan
(74) *Attorney, Agent, or Firm* — Yee & Associates, P.C.

(57) ABSTRACT

A method and apparatus for displaying group employee insurance information against benchmark information. Insurance profiles for business entities are retrieved from a data structure. A benchmark score corresponding to a benchmark category is generated for a current insurance profile of a selected business entity using the insurance profiles. The benchmark score indicates a portion of a selected premium for the current insurance profile that is paid by business entities that fall within the benchmark category. The current insurance profile is displayed in a graphical user interface on a display system. The benchmark score is displayed in association with the current insurance profile in the graphical user interface to aid a user in managing the employee insurance. Displaying the benchmark score in association with the insurance profile allows the user to more quickly and easily assess payment of the selected premium for the insurance profile in comparison to benchmark category.

24 Claims, 8 Drawing Sheets

(51) Int. Cl.
*G06F 3/0484* (2013.01)
*G06Q 10/06* (2012.01)
*G06T 11/20* (2006.01)

(52) U.S. Cl.
CPC ...... *G06Q 10/06313* (2013.01); *G06T 11/206* (2013.01); *G06T 2200/24* (2013.01)

(56) References Cited

U.S. PATENT DOCUMENTS

| | | | |
|---|---|---|---|
| 8,719,051 B2 | 5/2014 | Trifunov | |
| 10,152,573 B2 * | 12/2018 | Ting | G06Q 40/08 |
| 2002/0198802 A1 * | 12/2002 | Koresko | G06Q 40/08 |
| | | | 705/35 |
| 2004/0039608 A1 * | 2/2004 | Mazur | G06Q 40/08 |
| | | | 705/4 |
| 2005/0187804 A1 | 8/2005 | Clancy et al. | |
| 2009/0276247 A1 | 11/2009 | Howell | |
| 2010/0010836 A1 | 1/2010 | Rosen et al. | |
| 2011/0288876 A1 * | 11/2011 | Cardillo | G06Q 10/10 |
| | | | 705/2 |
| 2014/0114674 A1 | 4/2014 | Krughoff et al. | |
| 2014/0114872 A1 * | 4/2014 | Morgan | G06Q 40/08 |
| | | | 705/322 |
| 2016/0110817 A1 * | 4/2016 | Buccetti | G06Q 40/08 |
| | | | 705/4 |
| 2016/0154937 A1 * | 6/2016 | Hennenfent | G06Q 10/0639 |
| | | | 705/2 |
| 2016/0171618 A1 * | 6/2016 | Besman | G06Q 40/08 |
| | | | 705/4 |
| 2016/0171619 A1 * | 6/2016 | Besman | G06Q 40/08 |
| | | | 705/4 |
| 2016/0314533 A1 * | 10/2016 | Brown, III | G06Q 40/06 |
| 2016/0379309 A1 * | 12/2016 | Shikhare | G06Q 40/08 |
| | | | 705/4 |
| 2017/0098280 A1 * | 4/2017 | O'Brien | G06Q 40/08 |
| 2017/0186089 A1 * | 6/2017 | Brown, III | G06Q 40/06 |

OTHER PUBLICATIONS

"HealthAdvocate, Benefits Gateway, Health Information Dashboard TM," Health Advocate, Inc., copyright 2011, accessed May 3, 2016. http://www.healthadvocate.com/downloads/solutions/health-info-dashboard.pdf.

* cited by examiner

| CURRENT $538,966.92 | | RENEWAL $557,434.92 △$18,468.00 | | ALTERNATE PROVIDER $73,954.92 △-$465,012.00 | |
|---|---|---|---|---|---|
| ER | $328,050.36 (60.9%) | ER | $344,250.36 (61.8%) △$16,200.00 | ER | $51,330.36 (69.4%) △-276,720.00 |
| EE | $210,916.56 | EE | $213,184.56 △$2,268.00 | EE | $22,627.56 △-188,292.00 |
| M/EE 61 | $5,333.11 | M/EE | $5,336.25 △$3.14 | M/EE | $796.72 △-$4,536.39 |
| T.S. | 61% | T.S. | 62% | T.S. | 73% |
| MKT | 70% | MKT | 70% | MKT | 70% |
| IND | 74% | IND | 74% | IND | 74% |
| — MEDICAL | $531,720.00 | MEDICAL △$18,468.00 | $550,188.00 | MEDICAL △$-465,012.00 | $66,708.00 |
| (9) AETNTL-HDHP MC 3000/90% | $68,328.00 | (12) AETNTL-HDHP MC 3000/90% | $86,796.00 | (9) UHC-HDHP-2JZ-3000-100-Hou-TX | $66,708.00 |
| (26) AET-HNO HMO 3000/70%-HOU-TX | $183,456.00 | (26) AET-HNO HMO 3000/70%-HOU-TX | $183,456.00 | (26) UNMAPPED..... | $0.00 |
| (26) AET-HNO HMO 1000/70%-HOU-TX | $279,936.00 | (26) AET-HNO HMO 1000/70%-HOU-TX | $279,936.00 | (26) UNMAPPED..... | $0.00 |
| ✚ DENTAL | $0.00 | DENTAL △$0.00 | $0.00 | DENTAL △$0.00 | $0.00 |
| ✚ VISION | $4,516.56 | VISION △$0.00 | $4,516.56 | VISION △$0.00 | $4,516.56 |
| ✚ LIFE | $878.40 | LIFE △$0.00 | $878.40 | LIFE △$0.00 | $878.40 |
| ✚ STD | $0.00 | STD △$0.00 | $0.00 | STD △$0.00 | $0.00 |
| ✚ LTD | $1,851.96 | LTD △$0.00 | $1,851.96 | LTD △$0.00 | $1,851.96 |
| ✚ HSA | $0.00 | HSA △$0.00 | $0.00 | HSA △$0.00 | $0.00 |
| Create New | | Modify ▶ SUBMIT | | Modify ▶ SUBMIT | |
| ▲▼ Available Solutions | | Alternate Plans | | | |

FIG. 3A

*Figure 3A (300) — rotated diagram showing a user interface with sections 302, 306, 304 and elements 200, 202, 204, 208, 210, 238, 239, 240, 241, 243, 318, 320, 321, 322, 324, 326:*

| | 202 | 208 | 204 | 210 |
|---|---|---|---|---|
| CURRENT $538,966.92 | | RENEWAL $557,434.92 | | |
| EE 61 | ER  $328,050.36 (60.87%) | | ER  $344,250.36 (61.76%) | Δ $18,468.00 |
| | EE  $210,916.56 | | EE  $213,184.56 | Δ $16,200.00 |
| | MED/EE  $5,333.11 | | MED/EE  $5,336.25 | Δ $2,268.00 |
| | | | | Δ $3.14 |
| | TS.  61% | | TS.  62% | |
| | MKT 70% | | MKT 70% | |
| | IND 74% | | IND 74% | |

239, 241, 243 — 238 / 240

PLAN TYPE: [Medical ▼] — 318    PLAN: [AET-HNO HMO 1000/70%-HOU-TX => AET-H... ▼] — 320    ☆  [▽ Filter]  [In] [Out]

322 / 324 / 326 / 321

| AET-HNO HMO 1000/70%- HOU-TX $279,936.00 | AET-HNO HMO 1000/70%- HOU-TX $279,936.00  Δ $0.00 | AET-HNO HMO 1000/70%- HOU-TX $316,884.00  Δ $36,948.00 | AET-HNO POS 1500/80%- HOU-TX $343,380.00  Δ $63,444.00 | AET-HNO POS 1500/100%- HOU-TX $358,692.00  Δ $78,756.00 |
|---|---|---|---|---|
| MONTHLY PREMIUM | [POPULAR] | | | |
| EE 16 $564.00 | EE 16 $564.00 | $638.00 | $690.00 | $722.00 |
| ES 2 $1,182.00 | ES 2 $1,182.00 | $1,337.00 | $1,450.00 | $1,513.00 |

FROM FIG. 3A

| | | | | | |
|---|---|---|---|---|---|
| EC | 3 | $1,095.00 | $1,240.00 | $1,345.00 | $1,406.00 |
| EF | 5 | $1,731.00 | $1,961.00 | $2,128.00 | $2,219.00 |
| | | Total: $23,328.00 | Total: $26,407.00 | Total: $28,615.00 | Total: $29,891.00 |
| TYPE OF PLAN | | HMO OPEN ACCESS | POS | POS | POS |
| CALYR DEDUCTIBLE (IND/FAM) $1,000/$2,000 | | $1,000/$2,000 | $1,500/$4,500 | $1,000/$3,000 | $1,500/$4,500 |
| CARRIER COINSURANCE 70% | | 70% | 80% | 80% | 100% |
| MEMBER COINSURANCE 30% | | 30% | 20% | 20% | 0% |
| CALYROOP MAX (INCL DED) (IND/FAM) $4,000/$8,000 | | $4,000/$8,000 | $6,350/$12,700 | $6,350/$12,700 | $3,500/$10,500 |
| PRIMARY OFFICE VISIT $30 | | $30 | $35 | $30 | $35 |
| SPECIALIST OFFICE VISIT/ REFERRAL $50/NO | | $50/NO | $45/NO | $40/NO | $45/NO |
| INPATIENT/OUTPATIENT 70% AFTER DED / 70% AFTER | | 70% AFTER DED / 70% AFTER | 80% AFTER DED / 80% AFTER | 80% AFTER DED / 80% AFTER | 100% AFTER DED / 100% AFTER |
| 308 | | 310 | 312 | 314 | 316 |

DYNAMIC MODELING AND BENCHMARKING FOR BENEFITS PLANS

BACKGROUND INFORMATION

1. Field

The present disclosure relates generally to benefits plans and, in particular, to employer selection of benefits plans. Still more particularly, the present disclosure relates to a method and apparatus of improving a processing efficiency associated with managing benefits plans using dynamic modeling and benchmarking for these benefits plans.

2. Background

An employer provides employee benefits to its employees according to a benefits plan that includes different types of plans for the various employees. For example, an employer may provide health insurance to its employees based on an insurance plan that is offered at different rates to the various employees. As one specific example, a particular insurance plan may be offered at a first rate for an individual employee, a second rate for an employee and the employee's spouse, a third rate for an employee and the employee's children, and a fourth rate for an employee and the employee's entire family including spouse and children.

Insurance plans can be complex and many insurance providers provide a variety of insurance plans from which an employer can choose. For example, without limitation, insurance plans may vary based on whether the coverage is limited to a Health Maintenance Organization (HMO) or a Preferred Provider Organization (PPO). As another example, insurance plans may vary based on deductibles, the percentage of carrier coinsurance, the percentage of member coinsurance, and other features.

Further, different employers choose to pay for different percentages of the insurance premiums required by insurance providers. These percentages may be different across different markets or different industries. Knowing these percentages can help an employer in determining what percentage of the overall insurance premium to pay in order to be competitive in the marketplace with respect to employee benefits.

Thus, there may be many considerations for the employer to take into account when selecting a benefits plan for its employees. However, accessing the information needed to make a well-informed selection may be more tedious, difficult, and time-consuming than desired. In some cases, this information may not be readily available or easily acquirable.

SUMMARY

In one illustrative embodiment, a method is provided for online display of group employee insurance information against benchmark information. A plurality of insurance profiles for a plurality of business entities is retrieved from a data structure. The plurality of insurance profiles includes a current insurance profile for a selected business entity. A set of benchmark scores corresponding to a set of benchmark categories is generated for the current insurance profile of the selected business entity using the plurality of insurance profiles. A benchmark score in the set of benchmark scores indicates a portion of a selected premium for the current insurance profile that is paid by business entities that fall within a corresponding benchmark category of the set of benchmark categories. The current insurance profile for the selected business entity is displayed in a graphical user interface on a display system. The set of benchmark scores in association with the current insurance profile is displayed in the graphical user interface on the display system to aid a user affiliated with the selected business entity in managing the employee insurance provided to employees of the selected business entity. Displaying the set of benchmark scores in association with the current insurance profile allows the user to more quickly and easily assess payment of the selected premium for the current insurance profile in comparison to the set of benchmark categories.

In another illustrative embodiment, a method is provided for online display of group employee benefits information against benchmark information. A plurality of benefits profiles for a plurality of business entities is retrieved from a data structure. The plurality of benefits profiles includes a benefits profile for a selected business entity. A set of benchmark scores corresponding to a set of benchmark categories is generated for the benefits profile of the selected business entity using the plurality of benefits profiles. A benchmark score in the set of benchmark scores indicates a portion of a selected premium for the benefits profile that is paid by business entities that fall within a corresponding benchmark category of the set of benchmark categories. The benefits profile for the selected business entity is displayed in the graphical user interface on the display system. The set of benchmark scores in association with the benefits profile is displayed in the graphical user interface on the display system to aid a user affiliated with the selected business entity in managing the employee benefits provided to employees of the selected business entity. Displaying the set of benchmark scores in association with the benefits profile allows the user to more quickly and easily assess payment of the selected premium for the benefits profile in comparison to the set of benchmark categories.

In yet another illustrative embodiment, an apparatus comprises a data structure, a plan manager, and a graphical user interface. The plan manager retrieves a plurality of insurance profiles for a plurality of business entities from the data structure and generates a set of benchmark scores corresponding to a set of benchmark categories for a current insurance profile of a selected business entity of the plurality of business entities using the plurality of insurance profiles. The current insurance profile is one of the plurality of insurance profiles. A benchmark score in the set of benchmark scores indicates a portion of a selected premium for the current insurance profile that is paid by business entities that fall within a corresponding benchmark category of the set of benchmark categories. The graphical user interface displays the current insurance profile for the selected business entity on a display system and displays the set of benchmark scores in association with the current insurance profile. The graphical user interface aids a user affiliated with the selected business entity in managing an employee insurance provided to employees of the selected business entity. The set of benchmark scores displayed in association with the current insurance profile allows the user to more quickly and easily assess payment of the selected premium for the current insurance profile in comparison to the set of benchmark categories.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that it may be desirable to have a system capable of analyzing the benefits plans used by different business entities. Further, it may be desirable to visually present information about these benefits plans to a particular business entity for use in managing the benefits plan provided by that particular business entity to its employees. Thus, the illustrative embodiments provide a method and apparatus for dynamically modeling and benchmarking the benefits plans used by different business entities.

In particular, the illustrative embodiments provide a method and apparatus for the online display of group employee benefits information against benchmark information. In one illustrative example, the group employee benefits information takes the form of group employee insurance information. For example, without limitation, the group employee insurance information for a particular company may include the percentage of the premium of the company's current insurance plan that is paid by the company on behalf of the company's employees. This information may be displayed against a benchmark score that identifies the percentage of that insurance premium that is or would be paid by other companies in the same marketplace or industry based on historical data, current data, or both.

The company may be interested in renewing the current insurance plan with the same insurance provider or selecting an alternate insurance plan provided by a different insurance provider. The illustrative embodiments provide a method and apparatus for displaying the percentages of the premiums of the renewal insurance plan and the alternate insurance plans that would be paid by the company next to the percentage for the current insurance plan. Further, this information may be displayed against benchmark scores that identify the percentages of the insurance premiums for the renewal insurance plan and the alternate insurance plan that are being paid or would be paid by other companies in the same marketplace or industry based on historical data, current data, or both.

The information described above may be displayed online to the company through a graphical user interface on a display system. For example, the company may connect to an online-based system that generates the group employee insurance information and benchmark information that is then displayed to a user affiliated with the company. The company may then be able to make a well-informed decision about whether to renew or switch insurance plans using the information displayed online. In particular, the company may be able to very easily and quickly assess the company's contribution to employee insurance in comparison to the marketplace or industry to which the company belongs and make decisions accordingly.

Thus, the illustrative embodiments provide a method and apparatus for the online display of employee insurance information against benchmark information that solves the specific challenge of providing this type of benchmark information to a company quickly and efficiently to allow the company to make an informed decision about insurance quickly and efficiently. By obtaining the data needed to generate the benchmark information and displaying the benchmark information not only for the current insurance plan, but also a renewal insurance plan and one or more alternative provider insurance plans, in a same display or window, a company can quickly and easily make informed decisions without needing to go to multiple different sources for the information and assess the different types of insurance plans independently.

Figure 1:
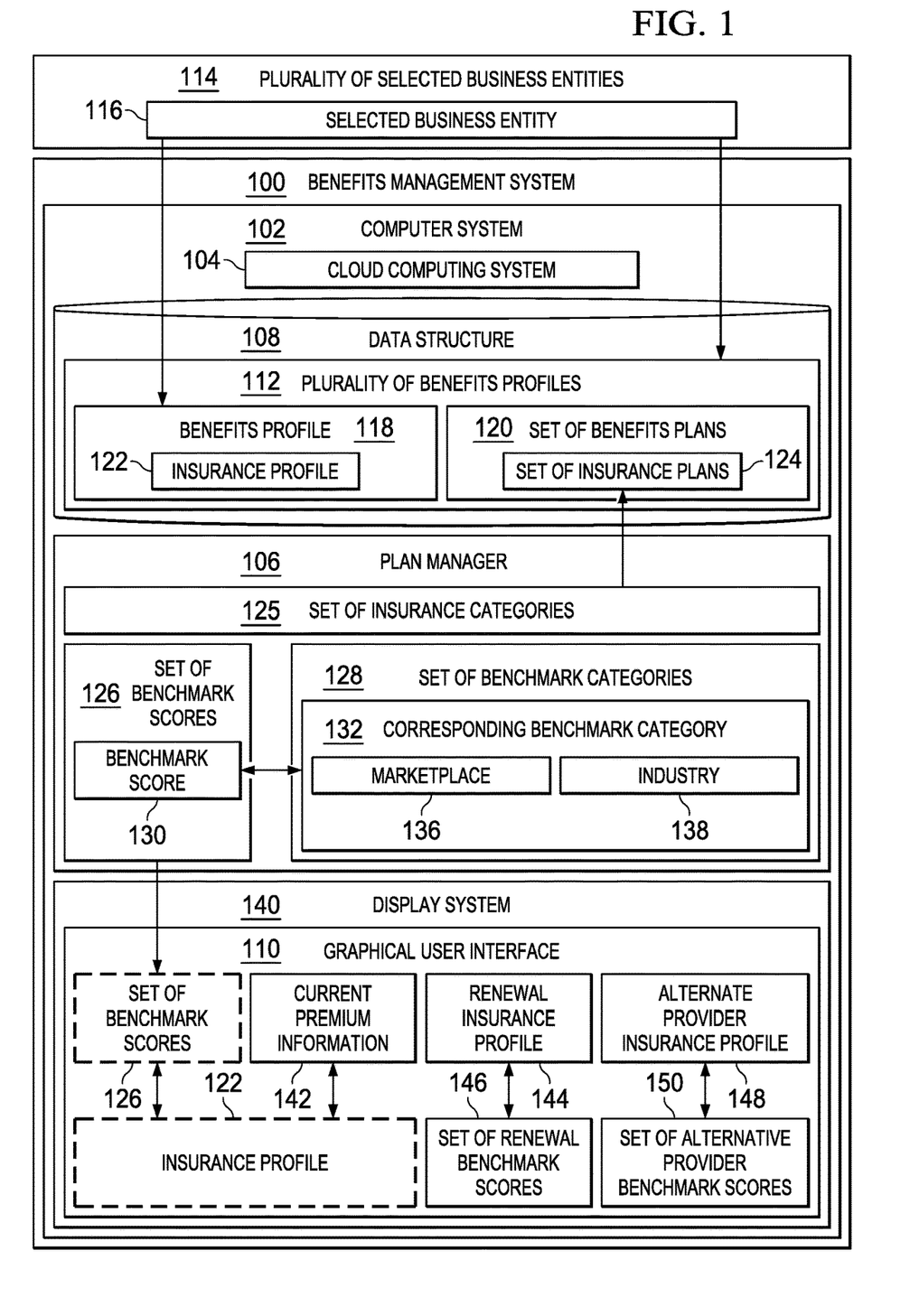
FIG. 1 is an illustration of a benefits management system in the form of a block diagram in accordance with an illustrative embodiment.

Referring now to the figures and, in particular, with reference to FIG. 1, an illustration of a benefits management system in the form of a block diagram is depicted in accordance with an illustrative embodiment. In this illustrative example, benefits management system 100 may be implemented using software, hardware, firmware, or a combination thereof.

When software is used, the operations performed by benefits management system 100 may be implemented using, for example, without limitation, program code configured to run on a processor unit. When firmware is used, the operations performed by benefits management system 100 may be implemented using, for example, without limitation, program code and data and stored in persistent memory to run on a processor unit.

When hardware is employed, the hardware may include one or more circuits that operate to perform the operations performed by benefits management system 100. Depending on the implementation, the hardware may take the form of a circuit system, an integrated circuit, an application specific integrated circuit (ASIC), a programmable logic device, or some other suitable type of hardware device configured to perform any number of operations.

A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In one illustrative example, benefits management system 100 is implemented using computer system 102. Computer system 102 may comprise a single computer or multiple computers in communication with each other. In some illustrative examples, benefits management system 100 may be implemented using cloud computing system 104.

As depicted, benefits management system 100 includes plan manager 106, data structure 108, and graphical user interface 110. Plan manager 106 may be implemented using software, firmware, or a combination thereof. In these illustrative examples, plan manager 106 is in communication with data structure 108 and graphical user interface 110.

Data structure 108 may take a number of different forms. Depending on the implementation, data structure 108 may comprise at least one of a database, a spreadsheet, a data storage unit, a cloud storage, a file, or some other type of data structure.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required.

For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

Data structure 108 stores plurality of benefits profiles 112 for plurality of business entities 114. In particular, each benefits profile in plurality of benefits profiles 112 corresponds to a business entity in plurality of business entities 114. A business entity in plurality of business entities 114, such as selected business entity 116, may be any type of employer. For example, without limitation, selected business entity 116 may be a small business, a large corporation, a family restaurant, or some other type of business entity that provides benefits to persons affiliated with the business entity.

Benefits profile 118 in plurality of benefits profiles 112 belongs to selected business entity 116. Benefits profile 118 includes information about set of benefits plans 120 offered by selected business entity 116. As used herein, a "benefits plan" may take the form of an insurance plan, a retirement plan, an allowance plan, an employee vehicle plan, or some other type of plan for employee benefits. Further, as used herein, a "set of" items, such as set of benefits plans 120, may include one or more items.

In one illustrative example, benefits profile 118 includes insurance profile 122 for selected business entity 116. Thus, set of benefits plans 120 includes set of insurance plans 124. Insurance profile 122 includes information about set of insurance plans 124 offered by selected business entity 116 to its employees.

Each insurance plan in set of insurance plans 124 may fall within a corresponding category in set of insurance categories 125. Set of insurance categories 125 may include, for example, without limitation, at least one of medical insurance, dental insurance, vision insurance, life insurance, short-term disability insurance, long-term disability insurance, health savings account (HSA) insurance, or some other type of insurance. Within each insurance category, one or more insurance different plans may be offered. Further, each insurance plan may be offered at different rates for the employees. For example, within the category of medical insurance, a particular medical insurance plan may be offered to an employee at an employee rate, an employee plus spouse rate, an employee plus child rate, an employee plus children rate, or an employee plus family rate.

Thus, insurance profile 122 may include, for example, without limitation, at least one of medical insurance information, dental insurance information, vision insurance information, life insurance information, short-term disability insurance information, long-term disability insurance information, health savings account plan information, and other types of information. For example, without limitation, insurance profile 122 may include the premiums required for each type of insurance plan offered, the employee premiums required for each type of insurance plan offered, or both.

A user affiliated with selected business entity 116 may be allowed to access and manage the information stored in data structure 108 on behalf of selected business entity 116 through graphical user interface 110. The user may be, for example, without limitation, a human resources (HR) manager, a supervisor, a chief executive officer, a president, a vice president, an employee, or some other person affiliated with selected business entity 116. Plan manager 106, data structure 108, and graphical user interface 110 provide a way for selected business entity 116 to manage set of insurance plans 124 offered by selected business entity 116.

For example, without limitation, plan manager 106 retrieves, from data structure 108, plurality of benefits profiles 112 for plurality of business entities 114. Plan manager 106 generates set of benchmark scores 126 corresponding to set of benchmark categories 128 based on insurance profile 122 of selected business entity 116.

Benchmark score 130 is an example of one of set of benchmark scores 126. In one illustrative example, benchmark score 130 may be generated for corresponding benchmark category 132 for insurance profile 122. In this illustrative example, benchmark score 130 indicates the average portion of a selected premium for insurance profile 122 that is or would be paid by business entities that fall within corresponding benchmark category 132. This selected premium may be an overall premium for all plans, a medical insurance premium, a dental insurance premium, or some other type of premium.

For example, corresponding benchmark category 132 may be selected from one of marketplace 136, industry 138, or some other type of category for which a benchmark score may be useful. Marketplace 136 is a category that includes the portion of plurality of business entities 114 that belongs to a particular marketplace. Industry 138 is the portion of plurality of business entities 114 that belongs to a particular industry.

Plan manager 106 displays benefits profile 118 of selected business entity 116 in graphical user interface 110 on display system 140. Displaying benefits profile 118 may include displaying all or a portion of the information included in benefits profile 118 in graphical user interface 110. Display system 140 may comprise one or more display devices. Display system 140 may be part of or in communication with computer system 102.

In one illustrative example, plan manager 106 displays insurance profile 122 of selected business entity 116 in graphical user interface 110. Displaying insurance profile 122 may include displaying all or a portion of the information included in insurance profile 122 in graphical user interface 110. For example, plan manager 106 may display details about set of insurance plans 124 that are currently being offered by selected business entity 116 in graphical user interface 110 on display system 140.

Plan manager 106 also displays set of benchmark scores 126 in association with insurance profile 122 in graphical user interface 110. Displaying set of benchmark scores 126 in association with insurance profile 122 in graphical user interface 110 enables a user affiliated with selected business entity 116 to quickly and easily assess payment of the selected premium for insurance profile 122.

Further, plan manager 106 also displays current premium information 142 based on insurance profile 122 for selected business entity 116 in graphical user interface 110. Current premium information 142 identifies the portion of the overall premiums paid by selected business entity 116 based on insurance profile 122. Current premium information 142 may be retrieved directly from, extrapolated from, or otherwise computed using information from insurance profile 122 for selected business entity 116.

The accessing of insurance profile 122 for selected business entity 116 and plurality of benefits profiles 112 for plurality of business entities 114 in data structure 108, the generation of set of benchmark scores 126 for insurance profile 122 of selected business entity 116, and the display of set of benchmark scores 126 in graphical user interface 110 allows selected business entity 116 to quickly and easily assess insurance profile 122 of selected business entity 116 through graphical user interface 110 and thereby, determine whether to modify insurance profile 122. Insurance profile 122 may be modified by, for example, without limitation, modifying set of insurance plans 124, adjusting the portion of the overall premiums paid by selected business entity 116, or both.

In some illustrative examples, plan manager 106 and graphical user interface 110 may be used to help selected business entity 116 determine whether to renew set of insurance plans 124 with a current insurance provider or to switch to a new insurance provider. In some cases, renewing with the current insurance provider may increase or decrease the overall premiums to be paid by selected business entity 116.

As one illustrative example, plan manager 106 may display renewal insurance profile 144 alongside insurance profile 122 in graphical user interface 110. Plan manager 106 may also display set of renewal benchmark scores 146 for renewal insurance profile 144. Set of renewal benchmark scores 146 may be generated in a manner similar to set of benchmark scores 126.

Further, plan manager 106 may display alternate provider insurance profile 148 alongside insurance profile 122 and renewal insurance profile 144 in graphical user interface 110. Plan manager 106 may also display set of alternate provider benchmark scores 150 for alternate provider insurance profile 148. Set of alternate provider benchmark scores 150 may be generated in a manner similar to set of benchmark scores 126.

Thus, through graphical user interface 110, selected business entity 116 may be able to quickly and easily compare insurance profile 122, renewal insurance profile 144, and alternate provider insurance profile 148 and to quickly and easily compare set of benchmark scores 126, set of renewal benchmark scores 146, and set of alternate provider benchmark scores 150. In this manner, selected business entity 116 may be able to more efficiently determine whether to renew with the current insurance provider or switch to a new insurance provider.

The illustration of benefits management system 100 in FIG. 1 is not meant to imply physical or architectural limitations to the manner in which an illustrative embodiment may be implemented. Other components in addition to or in place of the ones illustrated may be used. Some components may be optional. Also, the blocks are presented to illustrate some functional components. One or more of these blocks may be combined, divided, or combined and divided into different blocks when implemented in an illustrative embodiment.

Figure 2:
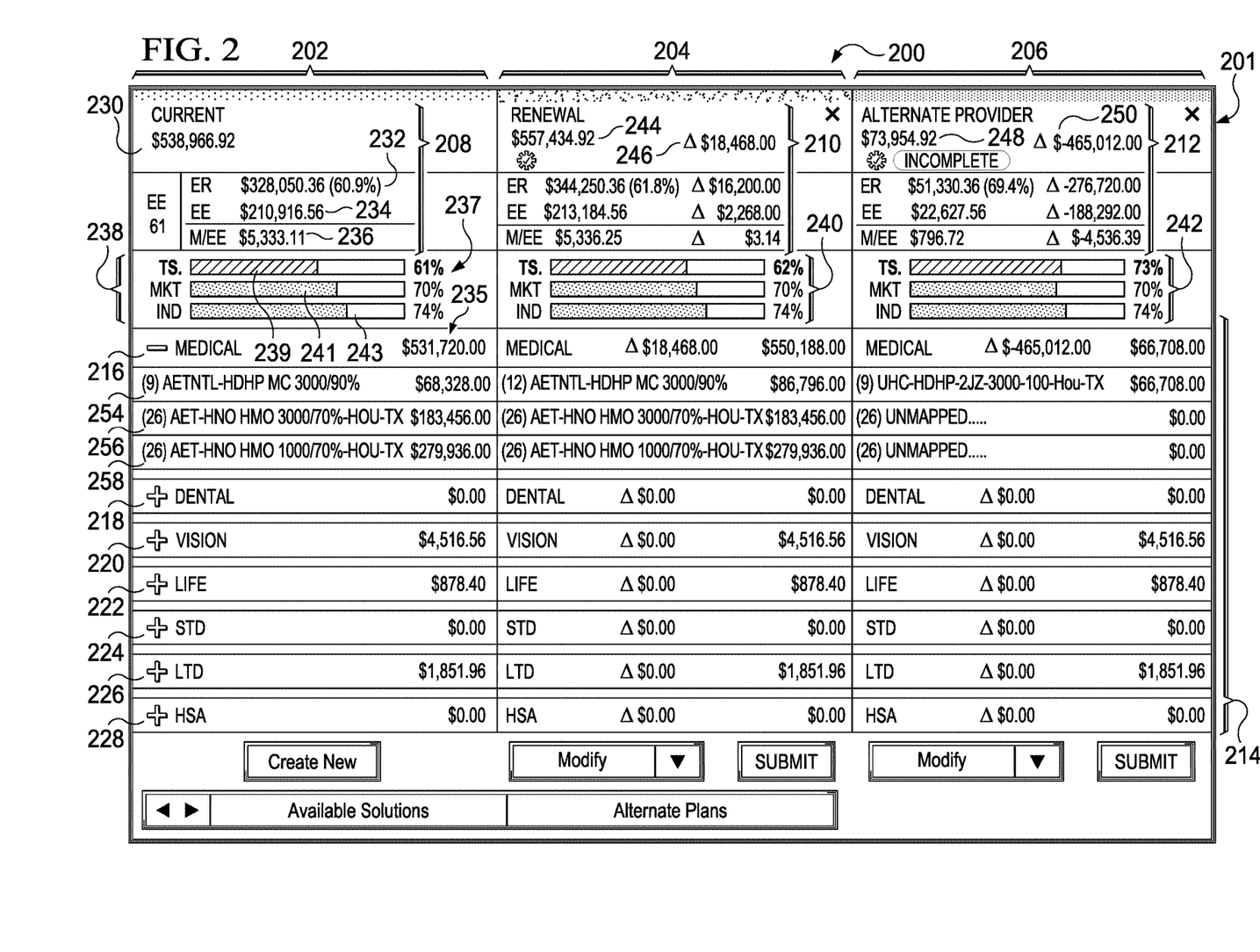
FIG. 2 is an illustration of a graphical user interface in accordance with an illustrative embodiment.

With reference now to FIG. 2, an illustration of a graphical user interface is depicted in accordance with an illustrative embodiment. In this illustrative example, graphical user interface 200 is an example of one implementation for graphical user interface 110 in FIG. 1.

In one illustrative example, graphical user interface 200 is part of a benefits management system, such as benefits management system 100 in FIG. 1, that is managed, operated, and serviced by a human capital management (HCM) services provider. Graphical user interface 200 presents profile display 201.

As depicted, graphical user interface 200 displays current insurance profile 202, renewal insurance profile 204, and alternate provider insurance profile 206. Current insurance profile 202, renewal insurance profile 204, and alternate provider insurance profile 206 may be examples of implementations for insurance profile 122, renewal insurance profile 144, and alternate provider insurance profile 148, respectively, in FIG. 1. Further, current insurance profile 202, renewal insurance profile 204, and alternate provider insurance profile 206 include current premium section 208, renewal premium section 210, and alternate provider premium section 212, respectively.

Current insurance profile 202, renewal insurance profile 204, and alternate provider insurance profile 206 are displayed for a particular client of the human capital management services provider with respect to set of insurance categories 214. This client may be an example of selected business entity 116 in FIG. 1. As depicted, set of insurance categories 214 includes medical insurance 216, dental insurance 218, vision insurance 220, life insurance 222, short-term disability insurance 224, long-term disability insurance 226, and health savings account insurance 228.

Each of current premium section 208, renewal premium section 210, and alternate provider premium section 212 identifies an overall premium for the various insurance plans offered for employees under set of insurance categories 214 as well as information about the percentages of the overall premium paid by the client versus the client's employees. For example, without limitation, current premium section 208 includes overall premium 230, employer rate 232, employee rate 234, and employee medical rate 236.

Overall premium 230 is the total cost of insurance for one year for the various insurance plans included in current insurance profile 202 with respect to set of insurance categories 214. Employer rate 232 is the portion of overall premium 230 that is paid by the client. Employee rate 234 is the portion of overall premium 230 that is paid by the employees of the client. In this illustrative example, employee medical rate 236 may be the average annual amount paid by the employer for each employee towards the medical insurance premium, including Health Savings Account contributions.

Further, in this illustrative example, current bar chart 238, renewal bar chart 240, and alternate provider bar chart 242 are displayed in association with current insurance profile 202, renewal insurance profile 204, and alternate provider insurance profile 206, respectively. Each of current bar chart 238, renewal bar chart 240, and alternate provider bar chart 242 presents a marketplace benchmark score, an industry benchmark score, and a profile score for the corresponding profile. For example, a profile score is presented for current insurance profile 202; a renewal profile score is presented for renewal insurance profile 204; and an alternate provider profile score is provided for alternate provider insurance profile 206, As depicted, current bar chart 238 presents profile score 239, marketplace benchmark score 241, and industry benchmark score 243. Marketplace benchmark score 241 and industry benchmark score 243 correspond to marketplace 136 and industry 138, respectively, as described in FIG. 1. In this illustrative example, each of profile score 239, marketplace benchmark score 241, and industry benchmark score 243 is presented as a bar in current bar chart 238 and as one of percentages 237 immediately following the current bar chart 238.

Profile score 239 is the average percentage of medical premium 235 for medical insurance 216 in current insurance profile 202 that is or would be paid by the client. Marketplace benchmark score 241 is the average percentage of medical premium 235 for medical insurance 216 that is or would be paid by all clients managed by the human capital management services provider. These clients all are considered as belonging to the same marketplace. Industry benchmark score 243 is the average percentage of medical premium 235 for medical insurance 216 that is or would be paid by all clients in the marketplace that belong to the same industry as the client.

In this illustrative example, renewal premium section 210 includes overall renewal premium 244 and premium delta 246. Premium delta 246 is the difference between overall renewal premium 244 and overall premium 230. Similarly, alternate provider premium section 212 includes overall alternate provider premium 248 and premium delta 250. Premium delta 250 is the difference between overall alternate provider premium 248 and overall premium 230.

The visual presentation of current bar chart 238, renewal bar chart 240, and alternate provider bar chart 242 in association with current insurance profile 202, renewal insurance profile 204, and alternate provider insurance profile 206, respectively, enables a user to quickly and easily assess current insurance profile 202 and make determinations about the portion of medical premium 235 that is being paid by the client compared to other business entities in the marketplace and industry.

In this illustrative example, medical insurance 216 has been selected and expanded. Current insurance profile 202 includes first plan 254, second plan 256, and third plan 258 under medical insurance 216. A user may select one of these plans to obtain more detailed information about the selected plan.

Figure 3A:
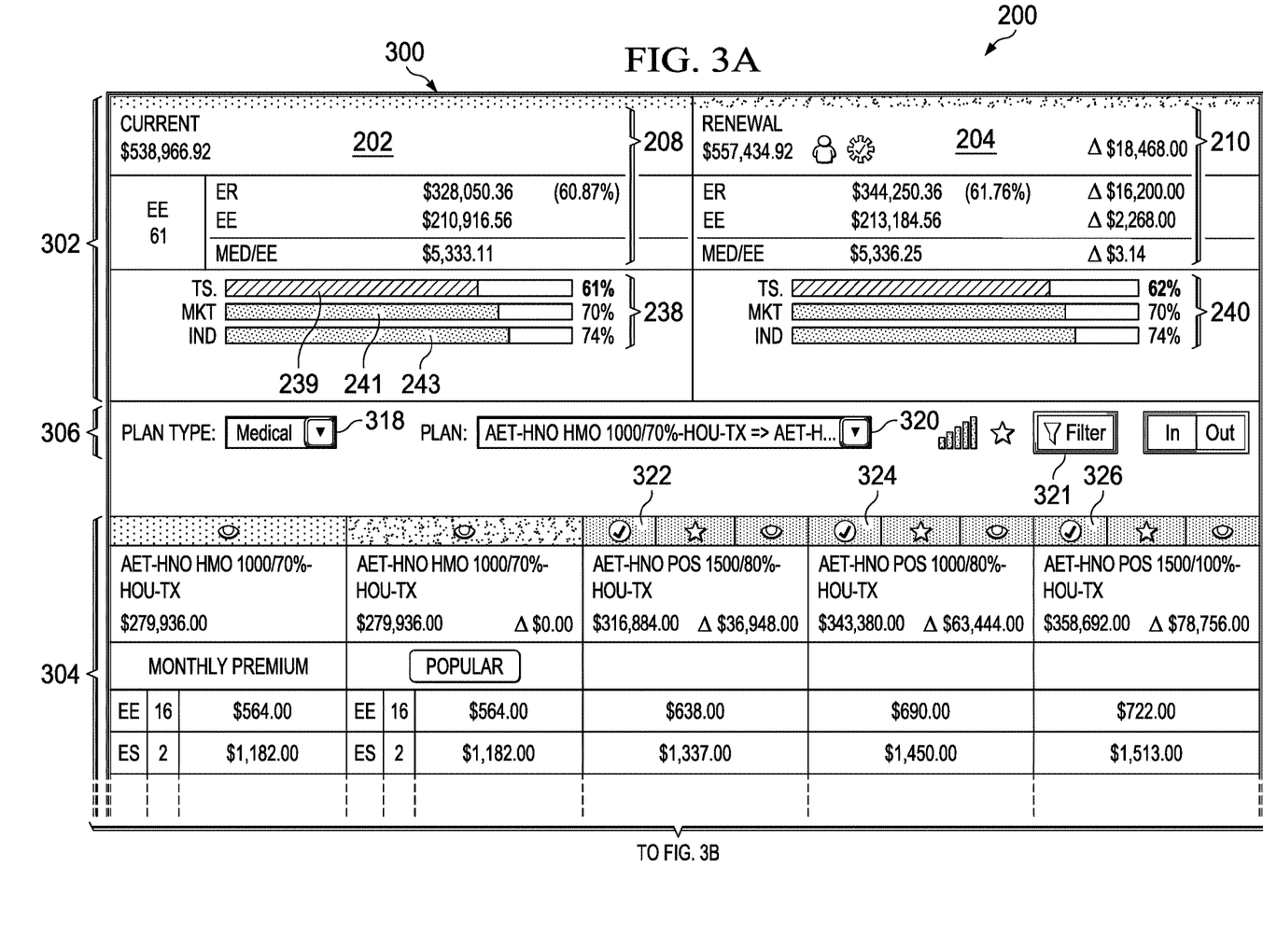
FIGS. 3A and 3B are illustrations of detailed information about a particular insurance plan displayed in a graphical user interface in accordance with an illustrative embodiment.
Figure 3B:
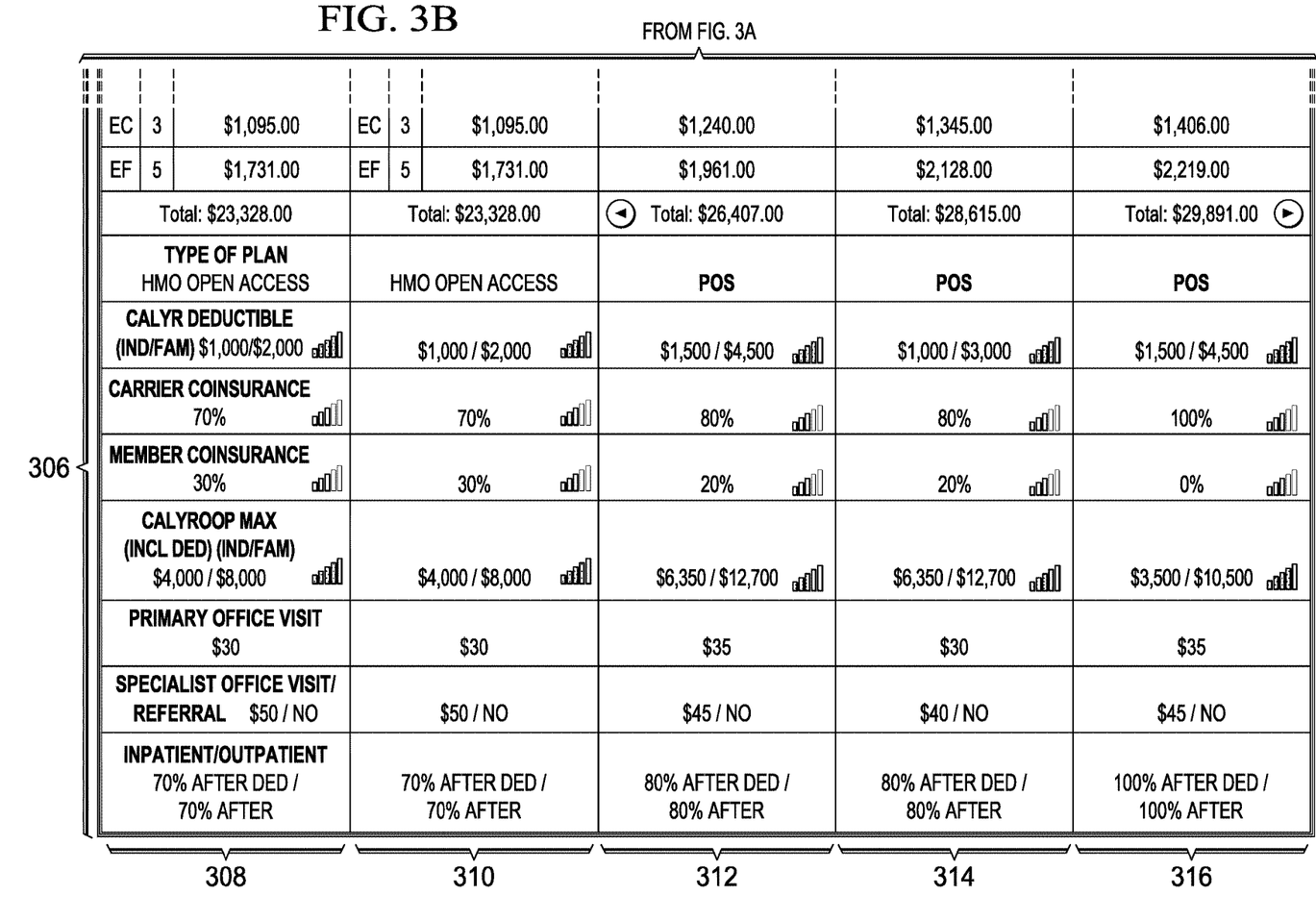

With reference now to FIGS. 3A and 3B, illustrations of detailed information about a particular insurance plan displayed in a graphical user interface are depicted in accordance with an illustrative embodiment. In this illustrative example, a user's selection of third plan 258 in graphical user interface 200 in FIG. 2 has resulted in graphical user interface 200 presenting plans display 300.

In this illustrative example, plans display 300 includes main section 302, plans section 304, and filter section 306. Main section 302 may remain fixed on plans display 300 in graphical user interface 200. As depicted, main section 302 includes current premium section 208 and current bar chart 238 from FIG. 2 as well as renewal premium section 210 and renewal bar chart 240 from FIG. 2.

Plans section 304 includes information about specific insurance plans. As depicted, plans section 304 provides information for currently selected plan 308, corresponding renewal plan 310, first alternate plan 312, second alternate plan 314, and third alternate plan 316. Plans section 304 includes plan type menu 318, plan menu 320, and filter graphical control 321. Plan type menu 318 is a drop-down menu that identifies each of set of insurance categories 214 from FIG. 2. A user may be able to select a different insurance category from plan type menu 318. The currently selected insurance category is the only insurance category displayed until a user selects plan type menu 318.

Plan menu 320 is a drop-down menu that identifies the various insurance plans that fall within the currently selected insurance category. A user may be able to select a different insurance plan by selecting plan menu 320.

Further, a user may select filter graphical control 321 to apply various filters in filter section 306, thereby changing the information displayed in plans section 304. For example, a selection of filter graphical control 321 may cause a window to be displayed over plan display 300. This window may allow the user to select various filter parameters for the alternate plans that are displayed in plans section 304. These filter parameters may include, but are not limited to, insurance provider, insurance category, type of premium, minimum premium, maximum premium, premium range, or some other type of factor.

In this illustrative example, plans section 304 includes graphical control 322, graphical control 324, and graphical control 326 for first alternate plan 312, second alternate plan 314, and third alternate plan 316, respectively. A selection of one of these graphical controls causes an alternate premium section and alternate benchmark scores for the corresponding alternate plan to be displayed in main section 302 instead of renewal premium section 210 and renewal bar chart 240.

The illustrations of graphical user interface 200 in FIGS. 2-3 are not meant to imply physical or architectural limitations to the manner in which an illustrative embodiment may be implemented. Other items in addition to or in place of the ones illustrated may be used. Some items may be optional.

Figure 4:
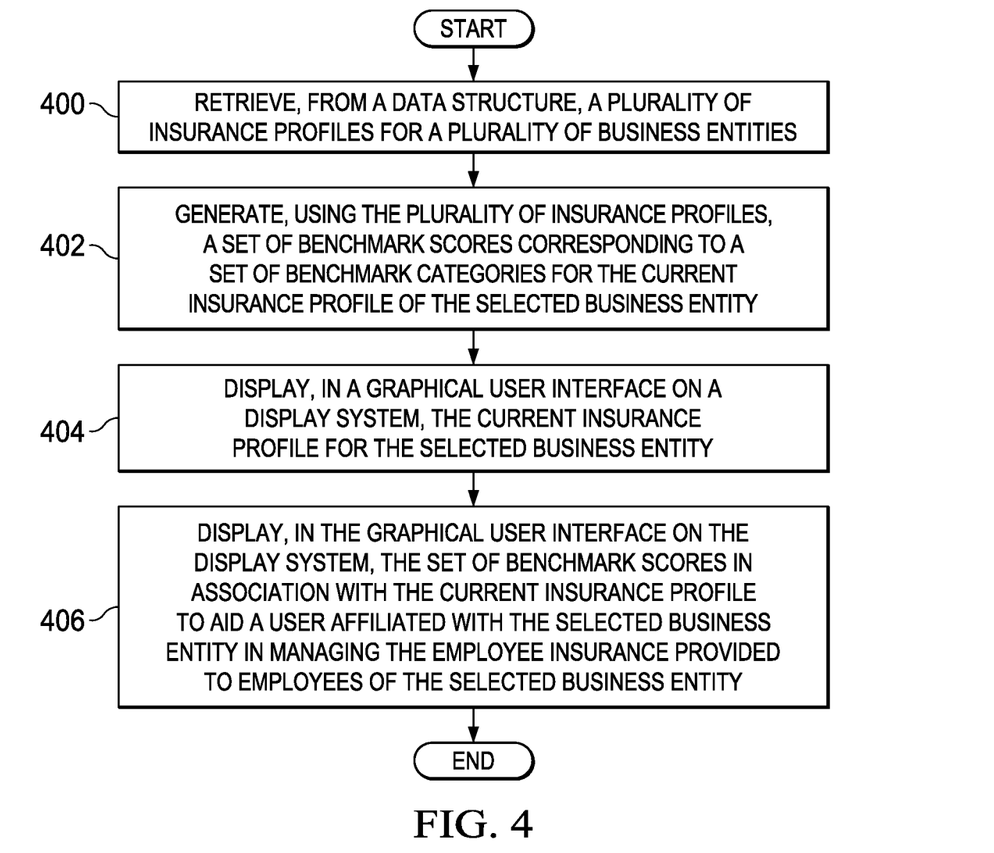
FIG. 4 is an illustration of a process for improving a processing efficiency associated with managing employee insurance in the form of a flowchart in accordance with an illustrative embodiment.

With reference now to FIG. 4, an illustration of a process for improving a processing efficiency associated with managing employee insurance is depicted in the form of a flowchart in accordance with an illustrative embodiment. The process illustrated in FIG. 4 may be implemented using benefits management system 100 in FIG. 1.

The process begins by retrieving a plurality of insurance profiles for a plurality of business entities from a data structure (operation 400). In operation 400, the plurality of insurance profiles includes a current insurance profile for a selected business entity. Next, a set of benchmark scores corresponding to a set of benchmark categories is generated for the current insurance profile of the selected business entity using the plurality of insurance profiles (operation 402). In operation 402, a benchmark score in the set of benchmark scores indicates a portion of a selected premium for insurance in the current insurance profile that is paid by business entities that fall within a corresponding benchmark category of the set of benchmark categories. This selected premium may be, for example, without limitation, an overall premium, a medical premium, a dental premium, or some other type of premium. In one illustrative example, the benchmark score is a percentage of the selected premium that is paid by business entities that fall within a particular benchmark category, which may be a marketplace category, an industry category, a category for members of a particular organization, a category for business entities of a certain size with respect to the number of employees, or some other type of category.

Thereafter, the current insurance profile for the selected business entity is displayed in a graphical user interface on a display system (operation 404). Further, the set of benchmark scores in association with the current insurance profile is displayed in the graphical user interface on the display system to aid a user affiliated with the selected business entity in managing the employee insurance provided to employees of the selected business entity (operation 406), with the process terminating thereafter. With respect to operations 404 and 406, displaying the set of benchmark scores in association with the current insurance profile allows the user to more quickly and easily assess payment of the selected premium for the current insurance profile in comparison to the set of benchmark categories.

Figure 5:
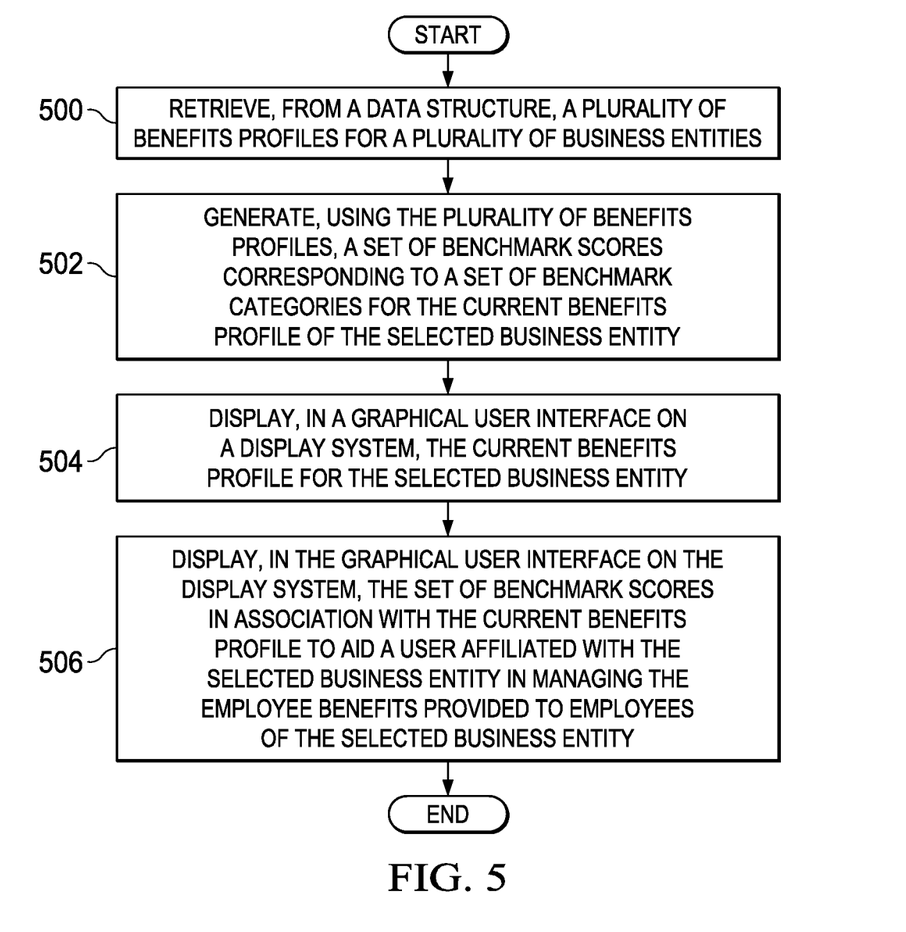
FIG. 5 is an illustration of a process for improving a processing efficiency associated with managing employee benefits in the form of a flowchart in accordance with an illustrative embodiment.

With reference now to FIG. 5, an illustration of a process for improving a processing efficiency associated with managing employee benefits is depicted in the form of a flowchart in accordance with an illustrative embodiment. The process illustrated in FIG. 5 may be implemented using benefits management system 100 in FIG. 1.

The process begins by retrieving a plurality of benefits profiles for a plurality of business entities from a data structure (operation 500). In operation 500, the plurality of benefits profiles includes a current benefits profile for a selected business entity. Next, a set of benchmark scores corresponding to a set of benchmark categories is generated for the current benefits profile of the selected business entity using the plurality of benefits profiles (operation 502). In operation 502, a benchmark score in the set of benchmark scores indicates a portion of a selected premium for the current benefits profile that is paid by business entities that fall within a corresponding benchmark category of the set of benchmark categories.

Thereafter, the current benefits profile for the selected business entity is displayed in a graphical user interface on a display system (operation 504). Further, the set of benchmark scores in association with the current benefits profile is displayed in the graphical user interface on the display system to aid a user affiliated with the selected business entity in managing the employee benefits provided to employees of the selected business entity (operation 506), with the process terminating thereafter. With respect to operations 504 and 506, displaying the set of benchmark scores in association with the current benefits profile allows the user to more quickly and easily assess payment of the selected premium for the current benefits profile in comparison to the set of benchmark categories.

Figure 6:
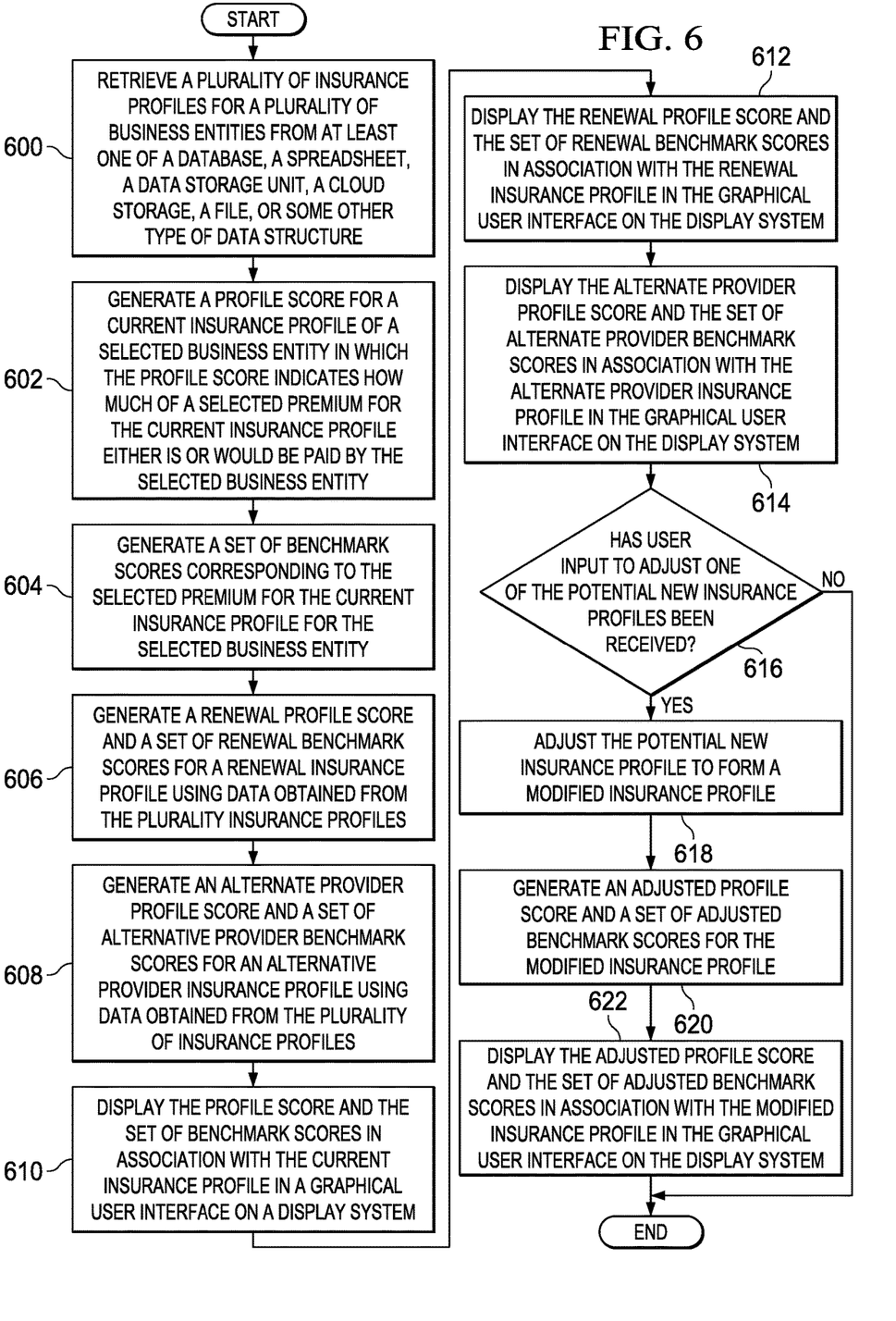
FIG. 6 is an illustration of a process for managing employee insurance in the form of a flowchart in accordance with an illustrative embodiment.

With reference now to FIG. 6, an illustration of a process for managing employee insurance is depicted in the form of a flowchart in accordance with an illustrative embodiment. The process illustrated in FIG. 6 may be implemented using benefits management system 100 in FIG. 1.

The process may begin by retrieving a plurality of insurance profiles for a plurality of business entities from at least one of a database, a spreadsheet, a data storage unit, a cloud storage, a file, or some other type of data structure (operation 600). Next, a profile score is generated for a current insurance profile of a selected business entity in which the profile score indicates how much of a selected premium for the current insurance profile either is or would be paid by the selected business entity (operation 602).

Thereafter, a set of benchmark scores is generated corresponding to the selected premium for the current insurance profile for the selected business entity (operation 604). In operation 604, the set of benchmark scores includes a marketplace benchmark score that indicates an average percentage of the selected premium for the current insurance profile of the selected business entity that either is or would be paid by the plurality of business entities belonging to a particular marketplace. Further, the set of benchmark scores includes an industry benchmark score that indicates an average percentage of the selected premium for the current insurance profile of the selected business entity that either is or would be paid by a portion of the plurality of business entities that belong to a particular industry.

Thereafter, a renewal profile score and a set of renewal benchmark scores is generated for a renewal insurance profile using data obtained from the plurality insurance profiles (operation 606). An alternate provider profile score and a set of alternative provider benchmark scores is generated for an alternative provider insurance profile using data obtained from the plurality of insurance profiles (operation 608).

Next, the profile score and the set of benchmark scores are displayed in association with the current insurance profile in a graphical user interface on a display system (operation 610). Then, the renewal profile score and the set of renewal benchmark scores are displayed in association with the renewal insurance profile in the graphical user interface on the display system (operation 612). Thereafter, the alternate provider profile score and the set of alternate provider benchmark scores are displayed in association with the alternate provider insurance profile in the graphical user interface on the display system (operation 614). In operation 612 and operation 614, the renewal insurance profile and the alternate insurance are potential new insurance profiles that may be selected for the selected business entity.

Next, a determination is made as to whether user input to adjust one of the potential new profiles has been received (operation 616). If user input has been received, the potential new profile is adjusted to form a modified insurance profile (operation 618). An adjusted profile score and a set of adjusted benchmark scores is generated for the modified insurance profile (620). Then, the adjusted profile score and the set of adjusted benchmark scores are displayed in association with the modified insurance profile in the graphical user interface on the display system (operation 622), with the process terminating thereafter.

With reference again to operation 616, if user input to adjust one of potential new insurance profiles has not been received, the process terminates. In other illustrative examples, if user input to adjust one of the potential new insurance profiles has not been received in operation 616, the process may wait until such user input has been received.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 7:
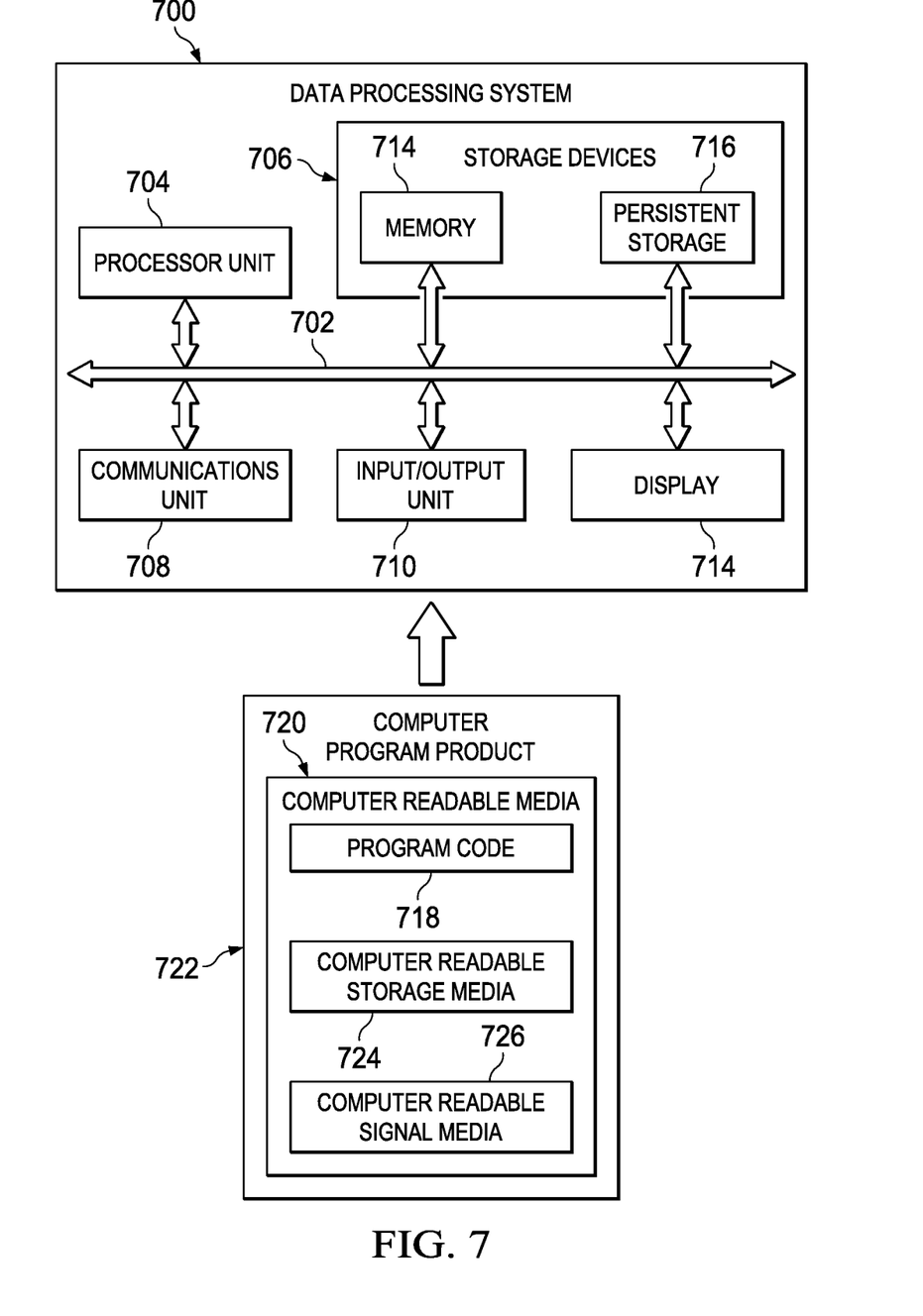
FIG. 7 is an illustration of a data processing system in the form of a block diagram in accordance with an illustrative embodiment.

Turning now to FIG. 7, an illustration of a data processing system in the form of a block diagram is depicted in accordance with an illustrative embodiment. Data processing system 700 may be used to implement computer system 102 in FIG. 1. As depicted, data processing system 700 includes communications framework 702, which provides communications between processor unit 704, storage devices 706, communications unit 708, input/output unit 710, and display 712. In some cases, communications framework 702 may be implemented as a bus system.

Processor unit 704 is configured to execute instructions for software to perform a number of operations. Processor unit 704 may comprise a number of processors, a multi-processor core, and/or some other type of processor, depending on the implementation. In some cases, processor unit 704 may take the form of a hardware unit, such as a circuit system, an application specific integrated circuit (ASIC), a programmable logic device, or some other suitable type of hardware unit.

Instructions for the operating system, applications, and/or programs run by processor unit 704 may be located in storage devices 706. Storage devices 706 may be in communication with processor unit 704 through communications framework 702. As used herein, a storage device, also referred to as a computer readable storage device, is any piece of hardware capable of storing information on a temporary and/or permanent basis. This information may include, but is not limited to, data, program code, and/or other information.

Memory 714 and persistent storage 716 are examples of storage devices 706. Memory 714 may take the form of, for example, a random access memory or some type of volatile or non-volatile storage device. Persistent storage 716 may comprise any number of components or devices. For example, persistent storage 716 may comprise a hard drive, a flash memory, a rewritable optical disk, a rewritable magnetic tape, or some combination of the above. The media used by persistent storage 716 may or may not be removable.

Communications unit 708 allows data processing system 700 to communicate with other data processing systems and/or devices. Communications unit 708 may provide communications using physical and/or wireless communications links.

Input/output unit 710 allows input to be received from and output to be sent to other devices connected to data processing system 700. For example, input/output unit 710 may allow user input to be received through a keyboard, a mouse, and/or some other type of input device. As another example, input/output unit 710 may allow output to be sent to a printer connected to data processing system 700.

Display 712 is configured to display information to a user. Display 712 may comprise, for example, without limitation, a monitor, a touch screen, a laser display, a holographic display, a virtual display device, and/or some other type of display device.

In this illustrative example, the processes of the different illustrative embodiments may be performed by processor unit 704 using computer-implemented instructions. These instructions may be referred to as program code, computer usable program code, or computer readable program code and may be read and executed by one or more processors in processor unit 704.

In these examples, program code 718 is located in a functional form on computer readable media 720, which is selectively removable, and may be loaded onto or transferred to data processing system 700 for execution by processor unit 704. Program code 718 and computer readable media 720 together form computer program product 722. In this illustrative example, computer readable media 720 may be computer readable storage media 724 or computer readable signal media 726.

Computer readable storage media 724 is a physical or tangible storage device used to store program code 718 rather than a medium that propagates or transmits program code 718. Computer readable storage media 724 may be, for example, without limitation, an optical or magnetic disk or a persistent storage device that is connected to data processing system 700.

Alternatively, program code 718 may be transferred to data processing system 700 using computer readable signal media 726. Computer readable signal media 726 may be, for example, a propagated data signal containing program code 718. This data signal may be an electromagnetic signal, an optical signal, and/or some other type of signal that can be transmitted over physical and/or wireless communications links.

The illustration of data processing system 700 in FIG. 7 is not meant to provide architectural limitations to the manner in which the illustrative embodiments may be implemented. The different illustrative embodiments may be implemented in a data processing system that includes components in addition to or in place of those illustrated for data processing system 700. Further, components shown in FIG. 7 may be varied from the illustrative examples shown.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application of the embodiments, and to enable others of ordinary skill in the art to understand the disclosure for various embodiments with various modifications as are suited to the particular use contemplated.

What is claimed is:

1. A method comprising:
dynamically modeling and benchmarking, using a computer system, a plurality of benefits plans for employer management of employee benefits for employees of a company by:
providing the computer system with a plan manager including a set of insurance categories, a set of benchmark scores and a set of benchmark categories;
retrieving, using a plan manager of the computer system, from a data structure a plurality of insurance profiles for a plurality of business entities, wherein the plurality of insurance profiles includes a current insurance profile for the company, wherein each of the plurality of insurance profiles includes information about an insurance plan, and wherein the current insurance profile includes information about a current insurance plan;
generating, using the plan manager of the computer system, a set of benchmark scores corresponding to a set of benchmark categories for the current insurance profile of the company using the plurality of insurance profiles, wherein a benchmark score in the set of benchmark scores indicates a portion of a selected premium for the current insurance profile that is paid by business entities that fall within a corresponding benchmark category of the set of benchmark categories identifies a percentage of a selected insurance premium that is or would be paid by other companies in a same marketplace or industry as the company, the benchmark score based on at least one of historical insurance premium data or current insurance premium data for the other companies;

displaying, in a graphical user interface on a display system, the current insurance profile for the company;

displaying, in the graphical user interface on the display system, the set of benchmark scores in association with the current insurance profile to aid a user affiliated with the company in managing the employee benefits;

displaying, in the graphical user interface on the display system, a selectable drop-down filter menu, wherein the selectable drop-down filter menu provides a filter graphical control allowing the user to change information displayed in a plans section for the company;

controlling automatically information displayed in the plans section about the plurality of benefits plans responsive to selection of a selected filter from the filter graphical control of the selectable drop-down filter menu using the graphical user interface on the display system;

displaying, in the graphical user interface, changed plan information in the plans section, the changed plan information determined according to filters selected by the user including a selected filter of the selectable drop-down filter menu;

responsive to selection of the selected filter, dynamically generating, using the plan manager of the computer system, an adjusted benchmark score according to a modified insurance profile received from a user, wherein the adjusted benchmark score identifies an adjusted percentage of the selected insurance premium that is or would be paid by the other companies in the same marketplace or industry as the company; and displaying, in the graphical user interface, the adjusted benchmark score, wherein displaying the set of benchmark scores in association with the modified insurance profile allows the user to more quickly and easily assess payment of the selected insurance premium for the modified insurance profile in comparison to the set of benchmark categories for the adjusted benchmark score.

2. The method of claim 1, wherein retrieving from the data structure the plurality of insurance profiles comprises:
retrieving the plurality of insurance profiles for the plurality of business entities from at least one of a database, a spreadsheet, a data storage unit, a cloud storage, or a file.

3. The method of claim 1 further comprising:
generating a set of renewal benchmark scores for a renewal insurance profile using data obtained from the plurality of insurance profiles; and displaying the set of renewal benchmark scores in association with the renewal insurance profile in the graphical user interface on the display system.

4. The method of claim 1 further comprising:
generating a set of alternative provider benchmark scores for an alternative provider insurance profile using data obtained from the plurality of insurance profiles; and displaying the set of alternative provider benchmark scores in association with the alternative provider insurance profile in the graphical user interface on the display system.

5. The method of claim 1, wherein displaying, in the graphical user interface on the display system, the set of benchmark scores comprises:
displaying each benchmark score in the set of benchmark scores as a bar in a bar chart associated with the current insurance profile in the graphical user interface.

6. The method of claim 1 further comprising:
displaying a potential new insurance profile for the company in the graphical user interface on the display system;

receiving user input that adjusts the potential new insurance profile to form a modified insurance profile through the graphical user interface;

generating a set of adjusted benchmark scores for the modified insurance profile; and displaying the set of adjusted benchmark scores in association with the modified insurance profile in the graphical user interface on the display system.

7. The method of claim 1, wherein the benchmark score is a marketplace benchmark score, and the adjusted benchmark score is an adjusted marketplace benchmark score.

8. The method of claim 1, wherein the benchmark score is an industry benchmark score, and the adjusted benchmark score is an adjusted industry benchmark score.

9. The method of claim 2 further comprising:
generating a profile score for the current insurance profile that indicates how much of the selected insurance premium for the current insurance profile either is or would be paid by the company.

10. The method of claim 2, wherein generating the set of benchmark scores comprises:
generating a marketplace benchmark score that indicates an average percentage of the selected insurance premium for the current insurance profile of the company that either is or would be paid by a portion of the plurality of business entities that belong to a particular marketplace.

11. The method of claim 2, wherein generating the set of benchmark scores comprises:
generating an industry benchmark score that indicates an average percentage of the selected insurance premium for the current insurance profile of the company that either is or would be paid by a portion of the plurality of business entities that belong to a particular industry.

12. The method of claim 9 further comprising:
displaying, in the graphical user interface on the display system, the profile score in association with the current insurance profile in proximity to the set of benchmark scores.

13. The method of claim 5 further comprising:
displaying a profile score for the current insurance profile as another bar in the bar chart in the graphical user interface.

14. A method for online display of group employee benefits information against benchmark information, the method comprising:

providing a computer system with a plan manager including a set of insurance categories, a set of benchmark scores and a set of benchmark categories;

retrieving, using the plan manager of a computer system, from a data structure a plurality of benefits profiles for a plurality of business entities, wherein the plurality of benefits profiles includes a benefits profile for a selected business entity;

generating, using the plan manager of the computer system, a set of benchmark scores corresponding to a set of benchmark categories for the benefits profile of the selected business entity using the plurality of benefits profiles, wherein a benchmark score in the set of benchmark scores indicates a portion of a selected premium for the benefits profile that is paid by business entities that fall within a corresponding benchmark category of the set of benchmark categories, wherein each of the plurality of benefits profiles includes information about an insurance plan;

displaying, in a graphical user interface on a display system, the benefits profile for the selected business entity;

displaying, in the graphical user interface on the display system, the set of benchmark scores in association with the benefits profile to aid a user affiliated with the selected business entity in managing the employee benefits provided to employees of the selected business entity;

displaying, in the graphical user interface on the display system, a selectable drop-down filter menu, wherein the selectable drop-down filter menu provides a filter graphical control allowing the user to change information displayed in a plans section about a plurality of benefits plans;

controlling automatically information displayed in the plans section about the plurality of benefits plans responsive to selection of a selected filter from the filter graphical control of the selectable drop-down filter menu using the graphical user interface on the display system;

responsive to selection of the selected filter from the selectable drop-down filter menu, dynamically generating, using the plan manager of the computer system, an adjusted benchmark score according to a modified insurance profile received from a user, wherein the adjusted benchmark score identifies an adjusted percentage of a selected insurance premium that is or would be paid by the other companies in the same marketplace or industry as the company; and displaying, in the graphical user interface, the adjusted benchmark score in the plans section, wherein displaying the set of benchmark scores in association with the benefits profile allows the user to more quickly and easily assess payment of the selected premium for the benefits profile in comparison to the set of benchmark categories.

15. An apparatus comprising:
a computer system including
  a data structure;
  a plan manager including a set of insurance categories, a set of benchmark scores and a set of benchmark categories, wherein the plan manager retrieves a plurality of insurance profiles for a plurality of business entities from the data structure and generates, using the plan manager of the computer system, a set of benchmark scores corresponding to a set of benchmark categories for a current insurance profile of a selected business entity of the plurality of business entities using the plurality of insurance profiles, wherein the current insurance profile is one of the plurality of insurance profiles; and wherein a benchmark score in the set of benchmark scores indicates a portion of a selected premium for the current insurance profile that is paid by business entities that fall within a corresponding benchmark category of the set of benchmark categories, wherein each of the plurality of insurance profiles includes information about an insurance plan, and wherein the plan manager is configured to, responsive to selection of the selected filter, dynamically generate, using the plan manager of the computer system, an adjusted benchmark score according to a modified insurance profile received from a user, wherein the adjusted benchmark score identifies an adjusted percentage of the selected insurance premium that is or would be paid by the other companies in the same marketplace or industry as the company; and
  a graphical user interface for displaying the current insurance profile for the selected business entity on a display system and for displaying the set of benchmark scores in association with the current insurance profile to aid a user affiliated with the selected business entity in managing an employee insurance provided to employees of the selected business entity, wherein the graphical user interface is further configured to display a selectable drop-down filter menu, wherein the selectable drop-down filter menu provides a filter graphical control allowing the user to change information displayed in a plans section about a plurality of benefits plans; wherein the graphical user interface is further configured to control automatically information displayed in the plans section about the plurality of benefits plans responsive to selection of a selected filter from the filter graphical control of teh selectable drop-down filter menu; wherein the graphical user interface is further configured to display changed plans information in the plans section, the changed plans information determined according to filters selected by the user; and wherein the graphical user interface is further configured to display the adjusted benchmark score,
wherein the set of benchmark scores displayed in association with the current insurance profile allows the user to more quickly and easily assess payment of the selected premium for the current insurance profile in comparison to the set of benchmark categories.

16. The apparatus of claim 15, wherein the data structure comprises at least one of a database, a spreadsheet, a data storage unit, a cloud storage, or a file.

17. The apparatus of claim 15, wherein the plan manager generates a set of renewal benchmark scores for a renewal insurance profile using data obtained from the plurality of insurance profiles and displays the set of renewal benchmark scores in association with the renewal insurance profile in the graphical user interface on the display system.

18. The apparatus of claim 15, wherein the plan manager generates a set of alternative provider benchmark scores for an alternative provider insurance profile using data obtained from the plurality of insurance profiles and displays the set of alternative provider benchmark scores in association with the alternative provider insurance profile in the graphical user interface on the display system.

19. The apparatus of claim 15, wherein the set of benchmark scores is displayed along with a profile score for the current insurance profile in a bar chart associated with the current insurance profile in the graphical user interface.

20. The apparatus of claim 16, wherein the plan manager generates a profile score for the current insurance profile that indicates how much of the selected premium for the current insurance profile either is or would be paid by the selected business entity.

21. The apparatus of claim 16, wherein the set of benchmark scores comprises:
 a marketplace benchmark score that indicates an average percentage of the selected premium for the current insurance profile of the selected business entity that either is or would be paid by a portion of the plurality of business entities that belong to a particular marketplace; and
 an industry benchmark score that indicates an average percentage of the selected premium for the current insurance profile of the selected business entity that either is or would be paid by a portion of the plurality of business entities that belong to a particular industry.

22. The apparatus of claim 20, wherein the plan manager displays the profile score in association with the current insurance profile in proximity to the set of benchmark scores in the graphical user interface on the display system.

23. The method of claim 7, wherein the marketplace benchmark score is an average percentage of medical premiums for medical insurance that is or would be paid by all clients managed by a human capital management services provider.

24. The method of claim 8, wherein the industry benchmark score is an average percentage of medical premiums for medical insurance that is or would be paid by all clients in an industry marketplace that belongs to the same industry as the company.

* * * * *